Patented Feb. 24, 1942

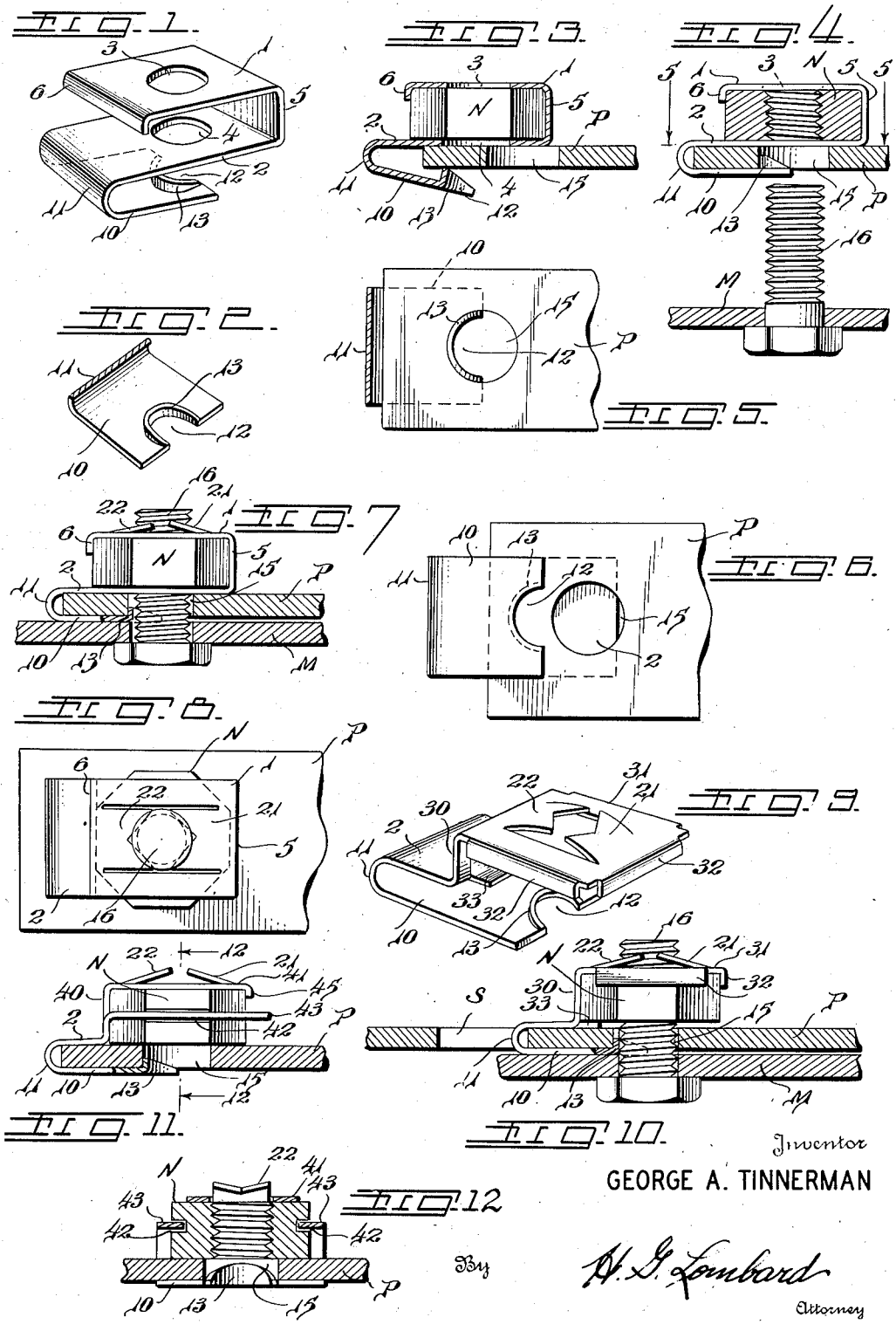

2,274,014

UNITED STATES PATENT OFFICE 2,274,014

NUT FASTENED INSTALLATION

George A. Tinnerman, Cleveland, Ohio, assignor to Tinnerman Products, Inc., Cleveland, Ohio, a corporation of Ohio Application February 20, 1941, Serial No. 379,887

18 Claims. (Cl. 151—15)

This invention relates in general to nut fastened installations and deals, more particularly, with improvements in nut holding devices for attaching standard nuts, and the like, in fastening position in an assembly prior to the application of a cooperating bolt or similar fastener thereto for securing the parts of the assembly.

In many assemblies, it is necessary or desirable to use a standard nut and bolt fastening means but it is usually a difficult problem, especially in blind locations, for the operator to hold the nut in place as the bolt is applied, or otherwise, maintain the nut against rotation during the final tightening of the bolt therewith. In practically any assembly in which the rearward side of a part is not conveniently or readily accessible for holding a nut in fastening position prior to application of the bolt, it is necessary to resort to some form of riveting, welding of other attaching means for retaining the nut in fastening position.

In the average installation requiring a cheap, inexpensive nut holding means, the cost of welding, or riveting clinch-on devices, and the like, generally is so expensive as to make the use thereof prohibitive, while such arrangements otherwise are objectionable in that no provision usually is made on the nut for locking the bolt in finally applied tightened fastening engagement therewith.

Similarly, heretofore known forms of sheet metal, cage or nut holding devices are objectionably expensive and complicated, and otherwise disadvantageous in requiring an entirely inordinate amount of time for attaching the same in fastening position in an installation. A primary object of the present invention, therefore, is to provide an improved form of sheet metal nut holder or retainer which is relatively simple and inexpensive to manufacture and includes in its construction a simplified, highly practical form of attaching means adapted for quick and easy application to fastening position in an installation in a minimum of time and effort.

A further, more specific object of the invention is for the provision of various forms of a nut holder for conventional or standard threaded nuts, tapping plates, or the like, comprising a sheet metal device having an improved attaching means defining a pair of arms for embracing the apertured part to which the nut is to be attached, with one of said arms including a locking detent serving as an indexing or positioning means which is easily and quickly applied to the aperture in said part through the medium of a sight opening adjacent said detent for guiding the same to attached position with the greatest speed and facility necessary in present methods of mass production embodying rapidly moving assembly line installations, and the like.

Another object of the invention is to provide various forms of nut holders of this character embodying integral means having a pronounced thread locking action with the associated bolt thread in a manner to prevent reverse movement or loosening of the bolt from tightened fastening position as a result of vibration, strain and jarring effects in a completed installation.

Further objects and advantages, and other new and useful features in the construction, arrangement and general combination of parts of the invention will be readily apparent to those skilled in the art as the description thereof proceeds with reference to the accompanying drawing, for purposes of illustration but not of limitation, in which like reference characters designate like parts throughout the same, and in which:

Fig. 1 is a perspective view of one form of the improved nut holder of the invention;

Fig. 2 is a fragmentary perspective showing the construction of the locking detent on the attaching arm of the nut holder represented in Fig. 1;

Fig. 3 is a sectional view showing the nut holder of Fig. 1 having a standard nut assembled therewith and in initially applied position for attaching the same to an apertured part;

Fig. 4 is a sectional view showing the assembled nut and nut holder in final attached position with a bolt about to be applied thereto for completing a fastening installation;

Fig. 5 is a sectional view taken on line 5—5 of Fig. 4, looking in the direction of the arrows; and, Fig. 6 is a bottom plan view of Fig. 3 illustrating the simplified application of the attaching arm of the nut holder to attached position on an apertured part;

Fig. 7 is a sectional view somewhat similar to Fig. 4 showing a modified nut holder construction provided with integral thread engaging means for locking the bolt in applied fastening position; and, Fig. 8 is a top plan view of Fig. 7;

Fig. 9 is a perspective of another form of nut holder construction in accordance with the invention;

Fig. 10 is a sectional view of a completed fastening installation embodying the nut holder shown in Fig. 9;

Fig. 11 is a sectional view showing a further form of nut holder as applied for retaining a nut in fastening position on an apertured part; and, Fig. 12 is a sectional view of Fig. 11 taken on line 12—12, looking in the direction of the arrows.

Generally speaking, a nut holder constructed in accordance with the present invention is best provided from any suitable ordinary sheet metal strip material, preferably tempered spring metal or cold rolled metal having spring-like characteristics. The nut holding portion of the device is shown provided in various improved forms together with an improved attaching means including an attaching arm, or the like, provided with a locking detent serving as an indexing or positioning means together with an adjacent sight opening advantageously facilitating application of the nut holder to the attached fastening position of the nut carried thereby, as presently to be described.

Referring now, more particularly, to the drawing, Fig. 1 shows one form of the improved nut holder in which a sheet metal strip is bent into a substantial S-shape to define a pair of cooperating nut holding arms 1, 2, having aligned bolt passages 3, 4, respectively. Said nut holding arms 1, 2, are spaced by a connecting portion or web 5 and are designed to hold, in frictionally and grippingly assembled relation therebetween, any selected form of standard nut, N, as shown in Fig. 3, with one of said arms including a retaining lug, such as flange 6, preventing accidental removal of the nut from assembled relation between said nut holding arms 1, 2. The arrangement otherwise is such that the bolt passages 3, 4 in said arms are in registration with the threaded opening in the nut while opposing flat side faces of the nut are engaged by the web 5 and retaining lug or flange 6, respectively, to prevent turning of the nut when a cooperating bolt is applied thereto and rotated to tightened fastening position.

The attaching arm 10 of the nut holder is formed by a generally U-shaped return bend 11 of an end portion of intermediate arm 2 and terminates substantially below the bolt passage 4 therein. As best seen in Fig. 2, the extremity of the attaching arm 10, is recessed in a manner to provide a suitable sight opening 12 and an adjacent locking projection or detent 13. Preferably, said detent 13 is formed from a marginal edge portion of the sight opening 12 to define a generally semicircular indexing or positioning element which snugly engages in a bolt opening in a part to retain the assembled nut and nut holder in attached position thereon, as hereinafter more fully set forth. The locking detent 13 preferably has its upper edge surface tapered generally downwardly and outwardly toward the free end of arm 10 to define an inclined cam surface which provides a flared opening between said arm 10 and the cooperating intermediate arm 2.

As best seen in Figs. 3 and 4, with the assembled nut and nut holder provided substantially as aforesaid, the attaching arm 10 is adapted to be applied over an edge of part P or through an assembling slot S, therein, as illustrated in Fig. 10, for example, to a position in which the nut holder retains the nut N in registration with a bolt opening 15 in said part.

Preferably, the normal spacing of resilient attaching arm 10 from cooperating intermediate arm 2 is somewhat less than the thickness of part P such that said attaching arm 10 must be spread slightly outwardly over the edge of said part on being initially applied, as shown in Fig. 3, thereafter resiliently clasping said part in final attached position, as represented in Fig. 4. In this respect, the inclined cam surface of the locking detent 13 defines a flared entrance at the leading end of the attaching arm 10 which facilitates the initial application thereof to part P by causing a gradual outward camming of said arm as necessary to clear the edge of the part easily and quickly. In such initially applied position, as shown in plan in Fig. 6, the sight opening 12 on the attaching arm 10 leaves the bolt passage 15 in part P uncovered and fully visible such that the attaching arm of the nut holder may be guided readily, in the least amount of time and effort, to the proper attaching position in which the locking detent 13 thereon will snap into said bolt opening 15 in the final applied fastening position of the nut on said part P, substantially as shown in Figs. 4 and 5. The locking detent 13 is preferably semicircular, and thereby snugly engages a material edge portion of the circular bolt opening 15, as best seen in Fig. 5, to lock the nut holder in final attached position, while otherwise leaving a sufficiently large passage for receiving any suitable bolt fastener 16, Fig. 4, to be applied to the nut N to secure a member M to said part P in a completed fastening installation.

Figs. 7 and 8 illustrate a further embodiment of the improved nut holder construction disclosed in Figs. 1–6, inclusive, wherein the bolt passage in the upper nut holding arm 1 is provided in the manner of integral, resilient bolt or screw thread engaging means 21, 22, concentrically arranged with respect to the screw threaded bolt passage in the nut, and otherwise aligned therewith in position for threadedly engaging the threads of the bolt 16 under a pronounced binding action to serve as a locking means therefor preventing loosening of the bolt from tightened fastening position due to vibration, strain and jarring effects in a completed installation.

Said thread engaging means 21, 22 may be pressed, stamped, extruded or otherwise provided from the base defined by arm 1 in any suitable form of construction so long as the same threadedly engage with the bolt threads. In this respect, the present invention fully contemplates the provision of such thread engaging means in various other related forms as in the manner of a substantial perforated hub pressed from the sheet metal and which is shaped to provide a helical thread or otherwise tapped to provide a plurality of threads for threadedly engaging the bolt. However, it has been found that such thread engaging means prepared in the form of cooperating, yieldable tongues 21, 22, as shown, are the most efficient and the most practical in that they are possessed of unusual inherent strength and will not collapse or pull through, nor loosen from effective locking engagement with the bolt even under extreme conditions of strain and vibration. This takes place by reason of the fact that the sheet metal material from which such tongues 21, 22, are formed, is of less thickness than the pitch or spacing of the threads of the bolt or screw 16, wherefore such tongues in moving toward each other to engage the bolt threads, cut into the grooves intermediate adjacent threads and otherwise become embedded in the root diameter of the bolt in locked, biting or frictional fastening engagement therewith in any position. In the present example, such tongues 21, 22 are shown as extending out of the plane of the sheet metal base defined by arm 1 in substantial ogee formation and provided with notched extremities forming substantial biting jaws designed to cut uniformly into the bolt shank and adjacent thread surfaces thereon in positive locking relation therewith in the most effective manner. It is to be understood, however, that the present invention is not limited in any manner or form to the specific construction shown of the thread engaging means 21, 22, but rather, comprehends also, various related forms of locking tongues or equivalent thread locking elements.

If desired, said tongues 21, 22, may be provided with arcuate or rounded extremities corresponding substantially to the root diameter of the bolt shank 16 to engage a thread convolution around the major portion of its periphery in providing for maximum uniform threaded engagement with the bolt. Preferably said extremities of the tongues are spaced in normal untensioned relation a distance somewhat less than the root diameter of the bolt, and otherwise so designed that when the bolt is threadedly engaged therewith, considerable strain is set up in the tongues to cause the extremities thereof to bind against the bolt shank between adjacent thread surfaces in providing the desired thread locking action on the bolt.

Accordingly, it will be understood that the bolt 16 is freely threaded into the nut N in the usual way and as the leading thread thereof engages the tongues 21, 22, a pronounced binding action of the extremities of said tongues with the root diameter of the bolt takes place, inasmuch as the distance between said extremities is somewhat less than the root diameter of the bolt. As the bolt is advanced axially to tightened fastening position, such as shown in Fig. 7, the extremities of said tongues are forced to spread apart to admit fully the bolt. Said tongues are thereby placed under a pronounced strain such that the extremities thereof necessarily cut into the root diameter of the bolt shank between adjacent thread surfaces to provide a biting, frictional locking engagement therewith under continuous spring tension. Such spring tension is provided for not only by the inherent resiliency of the tongues 21, 22, but also, by the resiliency of the spring metal composition of arm 1, which under such strain taking place in the tongues in threadedly engaging the bolt, has a tendency to become slightly bowed under tension. In this relation, the said arm 1, of course, attempts to assume its initially flat condition and thereby exerts a continuous spring force on the tongues 21, 22, to urge the extremities thereof inwardly toward each other in biting, frictional locking engagement with the bolt, as aforesaid, to lock the bolt against accidental turning and unintended rotation resulting from any vibration and jarring effects.

Additionally, it will be understood that the extremities of the tongues 21, 22, threadedly engage the bolt threads at points which may be referred to as out of phase with the threads in the bolt passage in the nut, N, and this, of course, adds to the effectiveness of the locking action supplied, in that the tongues when so tensioned, naturally exert a certain amount of axial pull on the bolt to cause a binding of the external thread surfaces thereof threadedly engaged with the internal thread surfaces of the nut.

Figs. 9 and 10 show another form of the invention which is similar in application and use to that of Figs. 1–6, inclusive, and includes equivalent thread locking means 21, 22, such as just described with reference to Figs. 7 and 8. The nut holder in this form is similarly contructed as respects the attaching arm 10, provided with locking detent 13, and cooperating intermediate arm 2 which is formed to provide the cage or nut holding portion of the device. Said arm 2 is bent to define a web 30 which in turn is bent to form the upper nut holding arm 31 overlying the top of the nut. One or more flanges 32 are bent from peripheral portions of said arm while the same otherwise is provided either with a simple aperture for passing the bolt or integral spaced tongues 21, 22, similar to Figs. 7 and 8, for effecting a thread locking action on the bolt. A retaining lug or finger 33 is struck out or otherwise formed to extend from said web 30 to engage the lower face of the nut N, as shown in Fig. 10, to retain the same in assembled relation with nut holder in cooperation with the upper arm 31 and flanges 32 which engage opposite sides of the nut to prevent turning thereof as the associated bolt 16 is rotated to tightened fastening position in an installation, substantially in the manner described with reference to Figs. 1–6, inclusive.

Figs. 11 and 12 show a further modification which is identical in application and use to the forms previously described and is similarly constructed except for the nut holding portion of the device. The intermediate cooperating arm 2 is bent similar to Fig. 9 to define a web 40 and an upper nut holding arm 41 for accommodating a nut N having grooves or slots 42 on opposite sides thereof. Said upper arm and web portion is slit longitudinally as necessary to define fingers 43, which are bent to extend in generally parallel and spaced relation to said upper arm 41 for entering the slots 42 on opposed sides of the nut, substantially as shown in Fig. 12. Said fingers 43 thus cooperate with the arm 41 of the nut holder to hold the nut N in assembled relation therewith while a retaining lug such as flange 45, or the like, may be provided from the free end of said arm 41 to retain the nut in the cage so constructed. The arm 41 otherwise is provided either with a simple aperture for passing the bolt or with integral thread engaging tongues 21, 22, or the like, for effecting a thread locking action on the bolt in fastening position, substantially as described with reference to the form of the invention shown in Figs. 7 and 8.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating short of said nut retaining arm for expediting application of the nut holder to attached relation with said part, and means on one of said arms receivable in the aperture in said part for maintaining the nut holder in attached relation thereon with the nut in position to receive a bolt for securing a member to said part.

2. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating short of said nut retaining arm for expediting application of the nut holder to attached relation with said part, and means on said attaching arm receivable in the aperture in said part for maintaining the nut holder in attached relation thereon with the nut in position to receive a bolt for securing a member to said part.

3. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating short of said nut retaining arm in a sight opening for expediting application of the nut holder to attached relation with said part, and a locking detent on one of said arms receivable in the aperture in said part for maintaining the nut holder in attached relation thereon with the nut in position to receive a bolt for securing a member to said part.

4. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating short of said nut retaining arm in a sight opening for expediting application of the nut holder to attached relation with said part, and a locking detent on said attaching arm receivable in the aperture in said part for maintaining the nut holder in attached relation thereon with the nut in position to receive a bolt for securing a member to said part.

5. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating short of said nut retaining arm in a sight opening for expediting application of the nut holder to attached relation with said part, and a locking detent adjacent said sight opening receivable in the aperture in said part for maintaining the nut holder in attached relation thereon with the nut in position to receive a bolt for securing a member to said part.

6. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating short of said nut retaining arm in a sight opening for expediting application of the nut holder to attached relation with said part, and a locking detent adjacent said sight opening receivable in the aperture in said part for maintaining the nut holder in attached relation thereon with the nut in position to receive a bolt for securing a member to said part, said locking detent being formed from a marginal edge portion of said sight opening and defining an inclined cam surface facilitating application of the attaching arm over an edge of said part.

7. In a nut holder, a sheet metal body comprising a pair of arms extending in the same general direction and adapted to receive an apertured part therebetween, one of said arms providing means for retaining a nut in assembled relation with the nut holder and having an opening for passing a bolt to be applied to said nut, the other arm terminating substantially below the bolt opening in said nut, and means on one of said arms receivable in the aperture in said part for maintaining the nut holder in attached relation thereon with the nut in position to receive a bolt for securing a member to said part.

8. In a nut holder, a sheet metal body comprising a pair of arms extending in the same general direction and adapted to receive an apertured part therebetween, one of said arms providing means for retaining a nut in assembled relation with the nut holder and having an opening for passing a bolt to be applied to said nut, the other arm being an attaching arm and terminating substantially below the bolt opening in said nut, and means on said attaching arm receivable in the aperture in said part for maintaining the nut holder in attached relation thereon with the nut in position to receive a bolt for securing a member to said part.

9. In a nut holder, a sheet metal body comprising a pair of arms extending in the same general direction and adapted to receive an apertured part therebetween, one of said arms providing means for retaining a nut in assembled relation with the nut holder and having an opening for passing a bolt to be applied to said nut, the other arm being an attaching arm terminating in a sight opening substantially below the bolt opening in said nut for expediting application of the nut holder to attached relation with said part, and a locking detent on one of said arms receivable in the aperture in said part for maintaining the nut holder in attached relation thereon with the nut in position to receive a bolt for securing a member to said part.

10. In a nut holder, a sheet metal body comprising a pair of arms extending in the same general direction and adapted to receive an apertured part therebetween, one of said arms providing means for retaining a nut in assembled relation with the nut holder and having an opening for passing a bolt to be applied to said nut, the other arm being an attaching arm terminating in a sight opening substantially below the bolt opening in said nut for expediting application of the nut holder to attached relation with said part, and a locking detent adjacent said sight opening receivable in the aperture in said part for maintaining the nut holder in attached relation thereon with the nut in position to receive a bolt for securing a member to said part.

11. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating in a sight opening substantially below the bolt opening in said nut for expediting application of the nut holder to attached relation with said part, and a locking detent adjacent said sight opening receivable in the aperture in said part for maintaining the nut holder in attached relation thereon with the nut in position to receive a bolt for securing a member to said part, said locking detent being formed from a marginal edge portion of said sight opening and defining an inclined cam surface facilitating application of the attaching arm over an edge of said part.

12. In a nut holder, a sheet metal body comprising a pair of arms extending in the same general direction and adapted to receive an apertured part therebetween, means on one of said arms for retaining a nut in assembled relation with the nut holder, the other arm terminating substantially below the bolt opening in said nut, means on one of said arms receivable in the aperture in said part for maintaining the nut holder in attached relation thereon and clearing a bolt applied to the nut for securing a member to said part, and means carried by one of said arms of the nut holder for engaging the bolt shank in locking the bolt in fastening engagement with the nut.

13. In a nut holder, a sheet metal body comprising a pair of arms extending in the same general direction and adapted to receive an apertured part therebetween, means on one of said arms for retaining a nut in assembled relation with the nut holder, the other arm being an attaching arm and terminating substantially below the bolt opening in said nut, means on said attaching arm receivable in the aperture in said part for maintaining the nut holder in attached relation thereon and clearing a bolt applied to the nut for securing a member to said part, and means carried by said nut retaining arm of the nut holder for engaging the bolt shank in locking the bolt in fastening engagement with the nut.

14. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating in a sight opening substantially below the bolt opening in said nut for expediting application of the nut holder to attached relation with said part, a locking detent on one of said arms receivable in the aperture in said part for maintaining the nut holder in attached relation thereon and clearing a bolt applied to the nut for securing a member to said part, and means carried by one of said arms of the nut holder for engaging the bolt shank in locking the bolt in fastening engagement with the nut.

15. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating in a sight opening substantially below the bolt opening in said nut for expediting application of the nut holder to attached relation with said part, a locking detent adjacent said sight opening receivable in the aperture in said part for maintaining the nut holder in attached relation thereon and clearing a bolt applied to the nut for securing a member to said part, and means carried by said nut retaining arm of the nut holder for engaging the bolt shank in locking the bolt in fastening engagement with the nut.

16. In a nut holder, a sheet metal body comprising a pair of arms extending in the same general direction and adapted to receive an apertured part therebetween, means on one of said arms for retaining a nut in assembled relation with the nut holder, the other arm being an attaching arm terminating in a sight opening substantially below the bolt opening in said nut for expediting application of the nut holder to attached relation with said part, a locking detent adjacent said sight opening receivable in the aperture in said part for maintaining the nut holder in attached relation thereon and clearing a bolt applied to the nut for securing a member to said part, said locking detent being formed from a marginal edge portion of said sight opening and defining an inclined cam surface facilitating application of the attaching arm over an edge of said part, and means comprising a pair of integral tongues, or the like, struck and formed from said nut retaining arm of the nut holder adapted to provide a thread locking action on the bolt in fastening engagement with the nut.

17. In a nut holder, a sheet metal body comprising a pair of arms adapted to receive an apertured part therebetween, one of said arms having a bolt passage and a return bent portion for retaining a nut in assembled relation with the nut holder, the other arm being an attaching arm terminating in a sight opening substantially below said bolt passage for expediting application of the nut holder to attached relation with said part, means on said attaching arm receivable in the aperture in said part for maintaining the nut holder in attached relation thereon, and means on said return bent portion for providing a thread locking action on a bolt in fastening engagement with the nut carried by the nut holder.

18. In a nut holder, a sheet metal body comprising a pair of arms adapted to receive an apertured part therebetween to hold a nut in attached position thereon, one of said arms being bent to define a portion overlying the top of said nut and an element cooperating therewith to retain the nut in assembled relation with the nut holder, the other arm being an attaching arm terminating substantially below the bolt opening in the nut, means on said attaching arm receivable in the aperture in said part for maintaining the nut holder in attached relation thereon, and means carried by said portion overlying the top of the nut for providing a thread locking action on a bolt in fastening engagement with the nut.

GEORGE A. TINNERMAN.